US011356278B2

(12) United States Patent
Shenoy et al.

(10) Patent No.: US 11,356,278 B2
(45) Date of Patent: Jun. 7, 2022

(54) BLOCKCHAIN DRIVEN EMBEDDED VIDEO AND DIGITAL SIGNATURES ON SIGNED DOCUMENTS

(71) Applicant: PLUMEDOT, INC., San Jose, CA (US)

(72) Inventors: Subrao Venugopal Shenoy, San Jose, CA (US); Saahil Shenoy, San Jose, CA (US)

(73) Assignees: Subrao Venugopal Shenoy, San Jose, CA (US); Saahil Shenoy, San Jose, CA (US)

( * ) Notice: Subject to any disclaimer, the term of this patent is extended or adjusted under 35 U.S.C. 154(b) by 0 days.

(21) Appl. No.: 17/339,892

(22) Filed: Jun. 4, 2021

(65) Prior Publication Data

US 2021/0385091 A1    Dec. 9, 2021

Related U.S. Application Data

(60) Provisional application No. 63/036,441, filed on Jun. 8, 2020.

(51) Int. Cl.
*H04L 9/32* (2006.01)
*H04N 7/15* (2006.01)

(52) U.S. Cl.
CPC ............. *H04L 9/3247* (2013.01); *H04N 7/15* (2013.01)

(58) Field of Classification Search
CPC ............................... H04L 9/3247; H04N 7/15
See application file for complete search history.

(56) References Cited

U.S. PATENT DOCUMENTS

| 2016/0048696 | A1 | 2/2016 | Follis | |
| 2016/0191513 | A1* | 6/2016 | Tomlinson | H04L 63/0861 713/168 |
| 2020/0159891 | A1 | 5/2020 | Patel et al. | |
| 2020/0258176 | A1* | 8/2020 | Gibson | H04L 9/3239 |

OTHER PUBLICATIONS

WO PCT/US2021/036022 ISR and Written Opinion, dated Sep. 8, 2021.

* cited by examiner

*Primary Examiner* — Arvin Eskandarnia
(74) *Attorney, Agent, or Firm* — One LLP

(57) ABSTRACT

Systems, devices and methods are provided for blockchain driven embedded video and digital signatures on signed documents. The present disclosure includes providing a video conference initiated with the process of signing a document. The video conference and the signing process and the video are recorded. The recorded video captures all conversations, understanding and the final signing by participants. Both the signature and the recorded signing event in video conference are stored with a hash value as a blockchain.

12 Claims, 22 Drawing Sheets

FIG. 4 Home screen after login

FIG. 6 BUNDLES OPENING FOR PLACING SIGNATURES AND LOCATIONS:

FIG. 6

FIG. 8 FILLABLE PDF TEMPLATE OPENING FOR SETTING UP:

FIG. 13 Documents Cancelled/Declined *1300*

FIG. 13

FIG. 15 Invite Signers in a
Video conference call –
Sharing Link

FIG. 16 Signed Document showing the Video Hash Tag at the audit report log of each signed document FIG. 17 Signing Report storing the hash value and the video link

BLOCKCHAIN DRIVEN EMBEDDED VIDEO AND DIGITAL SIGNATURES ON SIGNED DOCUMENTS

CROSS-REFERENCE TO RELATED APPLICATIONS

The present application claims priority to U.S. Provisional Application No. 63/036,441, filed Jun. 8, 2020, the disclosure of which is hereby incorporated by reference in its entirety for all purposes.

FIELD

Embodiments of the present disclosure generally relate to digital signatures on documents, and more specifically to blockchain driven embedded video and digital signatures on signed documents.

BACKGROUND

The main problem with digital signing today is it is "impersonal". Today the esign solutions are single dimensional, impersonal and error prone. First people do not read what they sign all the time and sign mechanically. Second the authentication of the signer is done via email and there is no visual confirmation that the signer is "who this person is".

Thus, there is a need for a digital signature (esign) technology providing interactive digital signatures on signed documents with authentication, the technology can use blockchain driven embedded video and digital signatures on signed documents, without the above disadvantages and provides other advantages as described herein.

SUMMARY

In general, the present disclosure can include providing a video conference initiated with the process of signing a document to make the process personal, and the sender of the document can verify visually who is signing. The video conference and the signing process can occur in an invited virtual room session, and the video can be recorded. The recorded video can capture all conversations, understanding and the final signing by participants. In some embodiments, both the signature and the recorded signing event in video conference can be stored with a hash value as a blockchain to make the stored data completely immutable.

In some embodiments, the present disclosure can include a computer-implemented method for blockchain driven embedded video and digital signature on a signed document, the method comprising: receiving a document for digital signature; receiving input indicating one or more locations or markers for digital signature; receiving input indicating video requirement for the signed document; sending a digital link to a user, wherein the digital link is configured to load a digital document and a videoconference session; receiving a digital signature for each of the one or more locations; receiving a video of the videoconference session; generating a hash value for the signed document and the video; storing the video, the signed document and the hash value; and updating a blockchain including the video, the signed document and the hash value.

In some embodiments, the present disclosure can also include computer-implemented method for hash-based embedded video and digital signature on a signed document, the method comprising: receiving a document for digital signature; receiving input indicating one or more locations for digital signature; receiving input indicating video requirement for the signed document; sending a digital link to a user, wherein the digital link is configured to load a digital document and a videoconference session; receiving a digital signature for each of the one or more locations; receiving a video of the videoconference session; generating a hash value for the signed document and the video; and storing the video, the signed document and the hash value.

This summary and the following detailed description are merely exemplary, illustrative, and explanatory, and are not intended to limit, but to provide further explanation of the invention as claimed. Additional features and advantages of the invention will be set forth in the descriptions that follow, and in part will be apparent from the description, or can be learned by practice of the invention. The objectives and other advantages of the invention will be realized and attained by the structure particularly pointed out in the written description, claims and the appended drawings.

BRIEF DESCRIPTION OF THE DRAWINGS

The present invention may be better understood by referring to the following figures. The components in the figures are not necessarily to scale. Emphasis instead being placed upon illustrating the principles of the disclosure. In the figures, reference numerals designate corresponding parts throughout the different views.

FIGS. 4 to 17 show exemplary user interfaces of the present disclosure.

DETAILED DESCRIPTIONS

Figure 1:
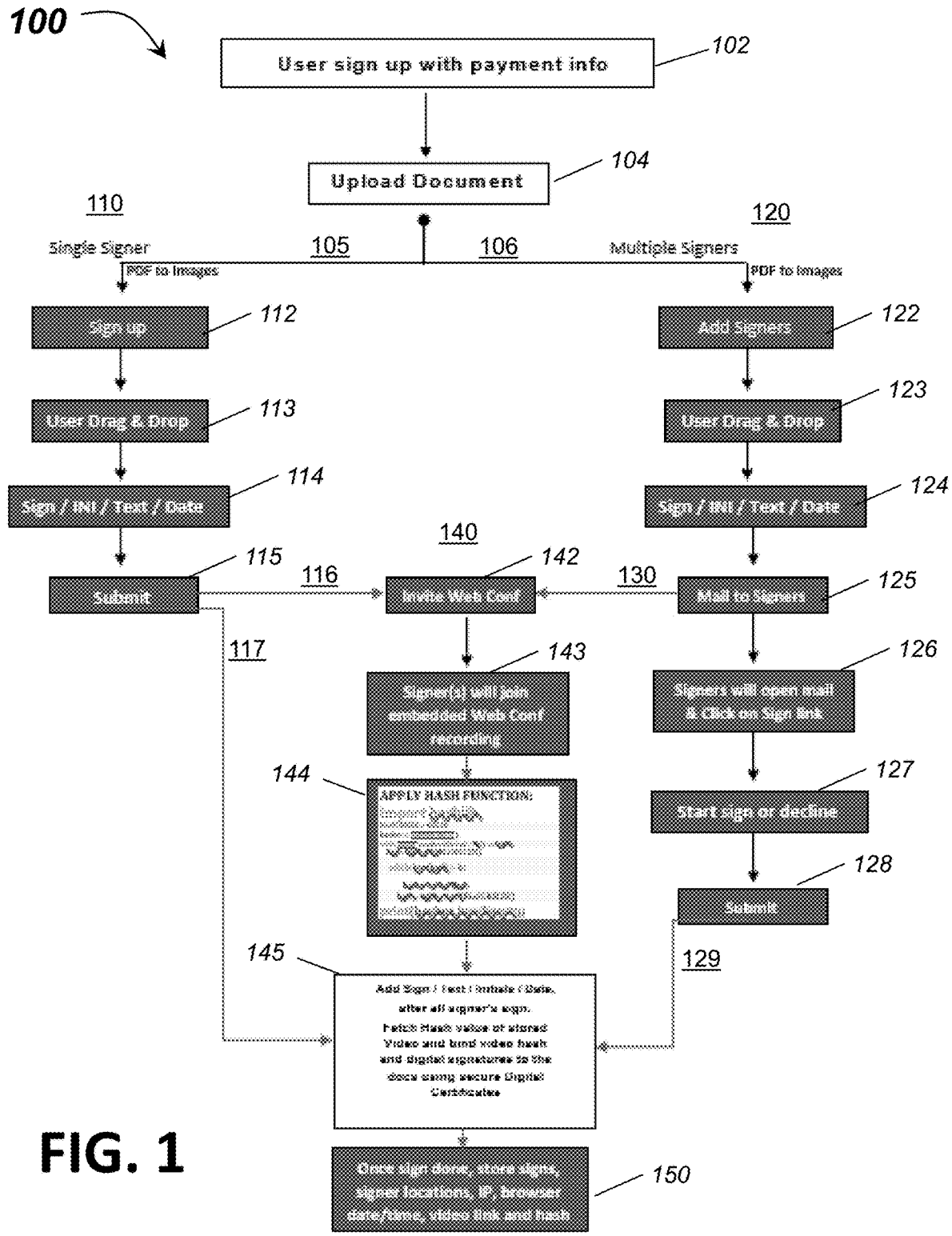
FIG. 1 shows an example process to provide blockchain driven embedded video and digital signatures on signed documents, according to some embodiments of the present disclosure.

The following disclosure describes various embodiments of the present invention and method of use in at least one of its preferred, best mode embodiments, which is further defined in detail in the following description. Those having ordinary skill in the art may be able to make alterations and modifications to what is described herein without departing from its spirit and scope. While this invention is susceptible to different embodiments in different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated. All features, elements, components, functions, and steps described with respect to any embodiment provided herein are intended to be freely combinable and substitutable with those from any other embodiment unless otherwise stated. Therefore, it should be understood that what is illustrated is set forth only for the purposes of example and should not be taken as a limitation on the scope of the present invention.

As used herein and in the appended claims, the singular forms "a," "an," and "the" include plural referents unless the context clearly dictates otherwise.

In general, terms such as "coupled to," and "configured for coupling to," and "secure to," and "configured for securing to" and "in communication with" (for example, a first component is "coupled to" or "is configured for coupling to" or is "configured for securing to" or is "in communication with" a second component) are used herein to indicate a structural, functional, mechanical, electrical, signal, optical, magnetic, electromagnetic, ionic or fluidic relationship between two or more components or elements. As such, the fact that one component is said to be in communication with a second component is not intended to exclude the possibility that additional components may be present between, and/or operatively associated or engaged with, the first and second components.

In the following description and in the figures, like elements are identified with like reference numerals. The use of "e.g.," "etc.," and "or" indicates non-exclusive alternatives without limitation, unless otherwise noted. The use of "including" or "includes" means "including, but not limited to," or "includes, but not limited to," unless otherwise noted.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

Provided herein are example embodiments of system, apparatus and method to provide blockchain driven embedded video and digital signatures on signed documents. The present disclosure includes practical application for and improving, among others, technologies for digital records management, tracking, and authentication, and technologies for collaboration and authentication of documentation.

An exemplary process 100 of the present disclosure is partly shown in FIG. 1. In this example, the process can include steps to provide for a user to prepare a document for signing. In some implementations, the process can include using an application (or App) of the present disclosure, which can be either desktop or mobile (an iOS-sample instantiation is shown below).

Figure 5:
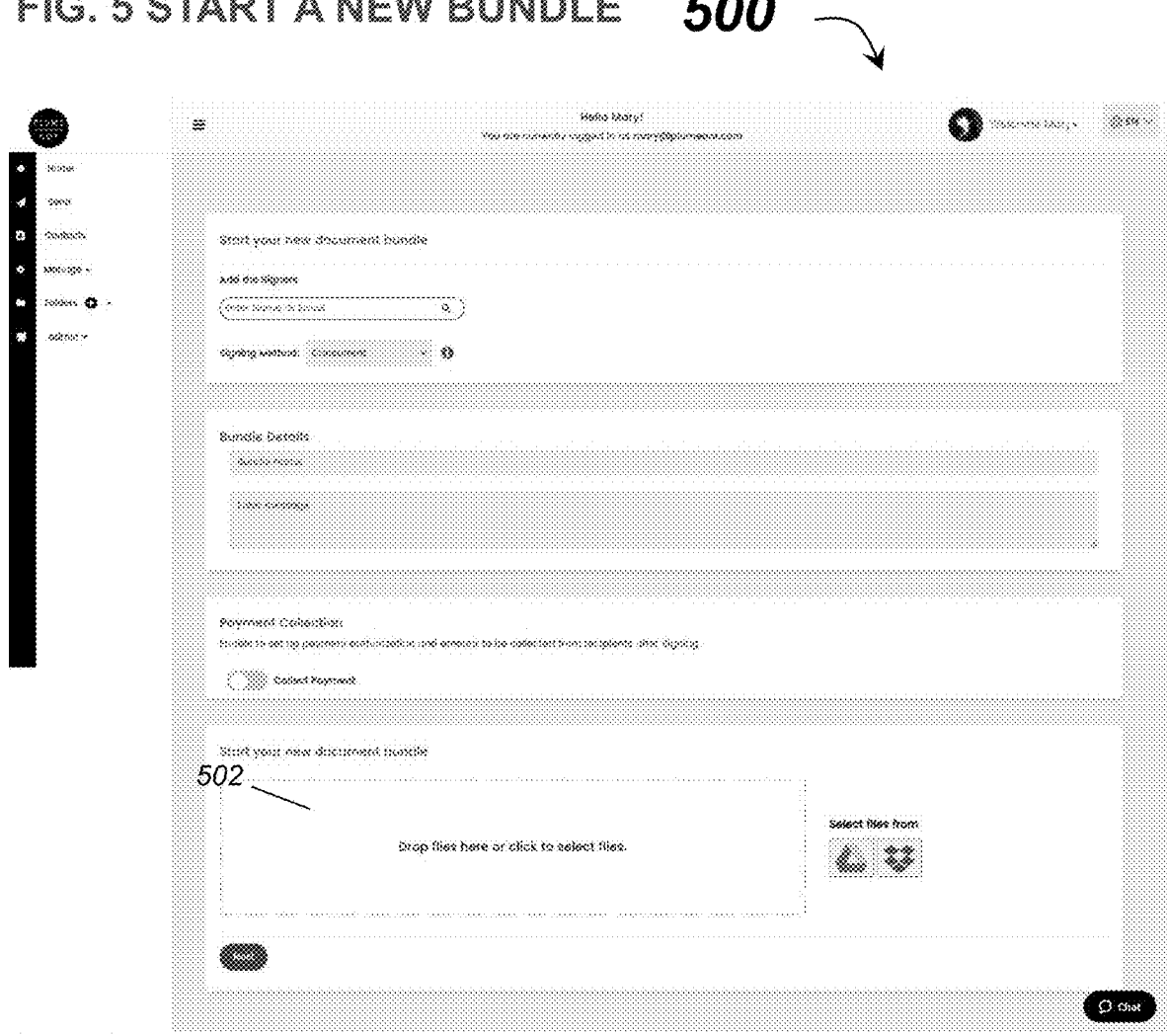

In some embodiments, at step 102, the process can include receiving a user's sign-in (or sign-up if new user), for example, for the service provided by the process. In the example of FIG. 1, the user is someone who has document(s) that needs to be signed. At step 104, the process can include receiving one or more document, which needs to be signed, from the user. In some implementations, also as shown in FIG. 5, the user (or a designated person or persons) can prepare a "bundle" for e-signing by selecting and uploading multiple documents from internal sources (e.g., PC, laptop, phone, etc.) or by integrating external drives (Dropbox, Google, Files, Gallery etc.). As used herein, a bundle is a set of documents needing signature.

Figure 7:
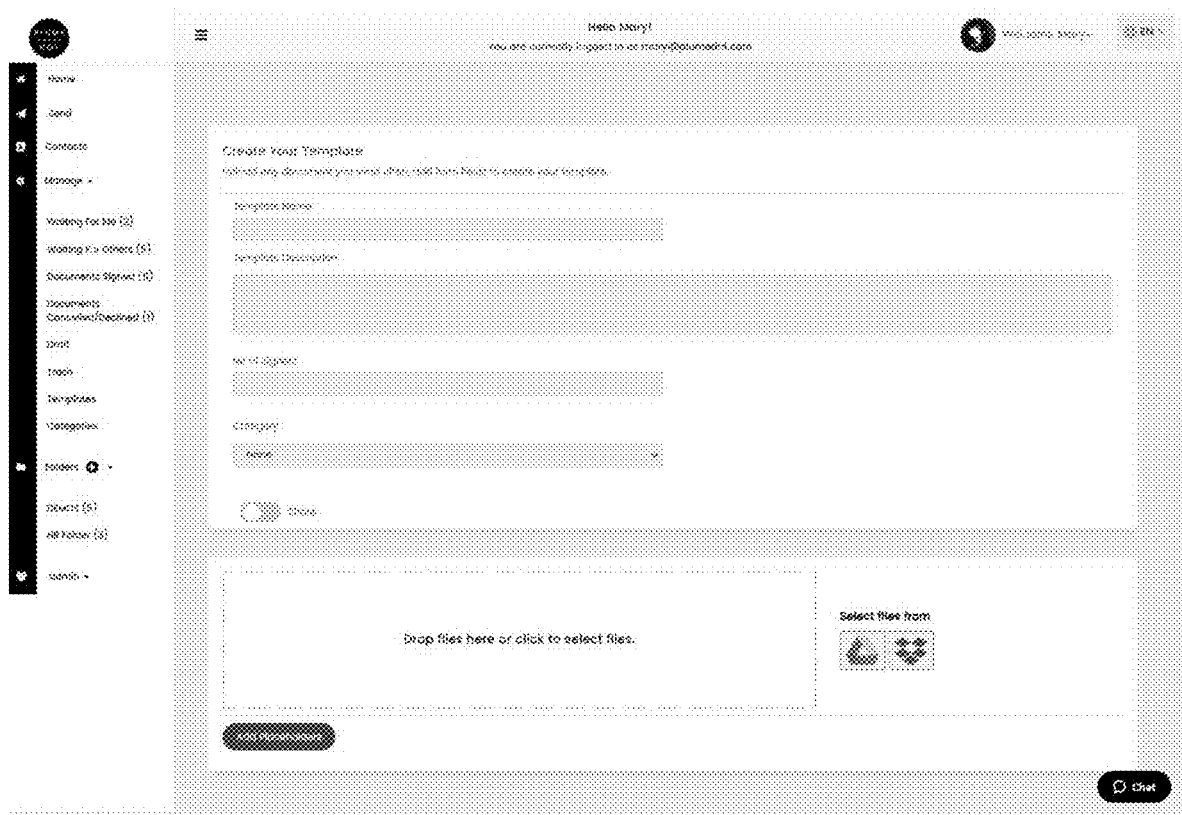

In some embodiments, after receiving the documents, by reference number 105, the process can include determining that only a single person needs to sign the document(s). For example, the user can specify only one person as signee. In some embodiments, the user can prepare the signing process by selecting a signer (or participant) for signing from a built-in contact manager (e.g., phone contacts) or entering name/email address manually. The left side reference number 110 of the flow diagram shows an exemplary "Single Signer" process. For example, at step 112, the single signer can sign in (or sign up, if new user). At step 113, the process can include the user dragging and dropping the documents(s) to the user's local device for editing and/or setting up. At step 114, also as shown in FIG. 7, process can include the user indicating, or setting up, the locations or markers in the document(s) where the signer can sign, initial, and date. For example, a GUI can be provided for the user to drag a Signature (or an Initial) box from a menu and drop it into a location where the signer can sign. At step 115, the process can include sending, e.g., via email, SMS, Slack or any suitable form of online notification/communication channel, the set-up document(s) to the signer. In some implementations, the user can announce to the signer via an app that a set of document(s) is coming their way for signing and submitting. In some implementations, the system can allow the signer to sign, initial and date the document(s) digitally.

In some implementations, after receiving the set-up document(s), the process can include validating and verifying that the document(s) are fully and correctly set up. The process can then include determining whether, by reference number 116, to invite the signer to a videoconference. A videoconference can show and record the signer signing the document(s). If no videoconference is needed or requested, by reference number 117, the process can include receiving the signed document(s) from the signer.

Back to step 104, after receiving the documents, by reference number 106, the process can include determining that multiple person(s) will need sign the document(s). In some embodiments, the user can prepare the signing process by selecting multiple signers (or participants) for signing from a built-in contact manager (e.g., phone contacts) or entering names/email addresses manually. The right side, by reference number 120, of the flow diagram shows and exemplary "Multiple Signers" process. For example, at step 122, the process can include the user adding multiple people as designated signers to the document(s). In some embodiments, the system can present to the user a user interface to add signers. The GUI can allow the user to indicate whether the signers can sign in sequence, or in parallel. At step 123, the process can include the user dragging and dropping the documents(s) to the user's local device for editing and/or setting up. At step 124, also as shown in FIG. 7, process can include the user indicating, or setting up, the locations or markers in the document(s) where each signer can sign, initial, and date. In some implementations, after receiving the set-up document(s), the process can include validating and verifying that the document(s) are fully and correctly set up. At step 125, the process can include sending, e.g., via email, the set-up document(s) to each signer. In some implementations, the user can announce to the signers (or participants) via an app that a set of documents is coming their way for signing.

The process can then include determining whether, by reference number 130, to invite the signers to a videoconference. A videoconference can show and record the signers signing the document(s).

If no videoconference is needed or specified, at step 126, the process can include each signer receiving and accessing the set-up document(s). In some implementations, the signers can access (or open) the document(s) by clicking on a link included in the email sent to the signers. At step 127, after accessing the document(s), the signer can sign them. In some implementations, the system can allow the signer to sign, initial and date the document(s) digitally, for example, right inside the accessed (opened) document(s).

At step 128, after each signer signs the document(s), the process can include the signer submitting the signed document(s) to the system, for example, by clicking on a Done button.

Back to step 125, if the user set up the document(s) as having videoconference, at the time the system sends an email to each signer with the link to the document(s), by reference number 130, the link can also cause the system to initiate a videoconference at step 142, for example, using Zoom™, Microsoft Team™, Google Meet™, and the like. At step 143, the process can include the signers joining the videoconference and the user, as well as the signers, can witness each signer signs the document(s). The videoconference can also provide for signer collaborations so that the participants can ask any questions or clarification during signing. All conversations, understanding and the final signing are recorded. Participants can be in the same room or be in different locations remotely.

The videoconference is recorded by default.

Back to step 115, if the user set up the document(s) as having videoconference, at the time the system sends an email to the signer with the link to the document(s), by reference number 116, the link can also cause the system to initiate a videoconference at step 142.

Figure 16:
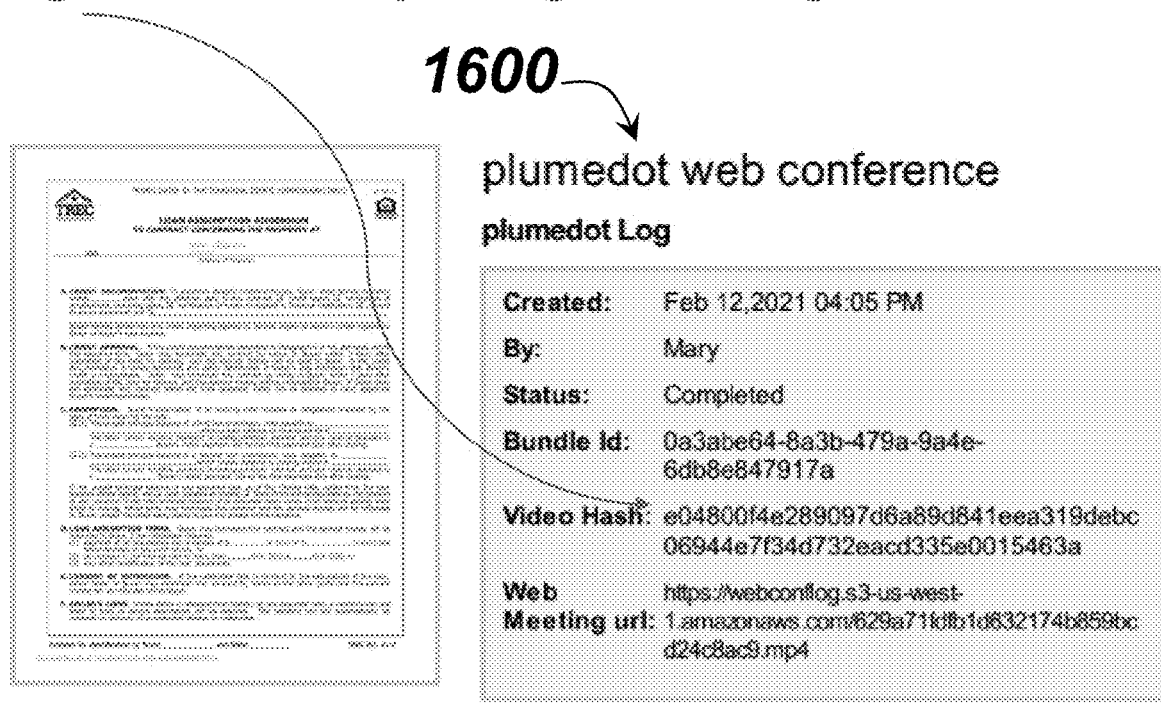

At step 144, after the signed document(s) have been received by the system, and the videoconference recording is complete, the process can the include the system storing (saving) the videoconference recording of the signing process (video/audio) as a video media and storing the signed document(s). The system can also generate all the necessary digital certificate attachments to the signatures. The system can also generate a hash function of the recorded video. The hash value can be stored as part of the digital signing on the document. The hash value thus makes the document ready to be part of a blockchain, in some embodiments. In some implementations, as shown in FIG. 16 example, the stored video can be accessed by clicking a video link displayed with a completed bundle.

An example hash function can be implemented via a code like below:
import hashlib
BLOCKSIZE=65536
hasher=hashlib.md5( )
with open('anotherfile.txt', 'rb') as afile:
   buf=afile.read(BLOCKSIZE)
   while len(buf)>0:
     hasher.update(buf)
     buf=afile.read(BLOCKSIZE)
print(hasher.hexdigest( ))

Note that any other suitable coding language can also be used.

In some embodiments, a hash can be a one-way hash or many other hash functions commercially available. It can take a few seconds to generate the hash from the streamed video.

At step 145, the process can include binding the digital signature to the document using, for example, digital certificate. If the signing process includes videoconference, the process can include fetching the hash value of the video and bind the video and the digital signature to the document using, for example, digital certificate.

In some embodiments, the Digital Certificate can be used when the signatures are saved in a PDF using a public/private key standard encryption. The digital certificate which is used for the signing enables this and its root link can be traced by any PDF reader tool. The digital certificate can be stored under a SOC 2 compliance high security data server, for example, at MSFT Azure or Amazon (AWS) like data under a HSM box (hardware security module). This digital certificate is non tamperable and together with Advanced PDF engineering standards implemented in the system, a PDF reader can validate the authenticity of this digital certificate anytime in the future even after the original certificate has expired. This process is called LTV (long term validation). This can ensure the integrity of the document and the video signatures long after the current certificate has expired protecting the users and signers.

At step 150, the process can include storing the hash value of the recorded signing video along with a link pointing to video. The system can also store credentials of each signer, for example: name, IP address, email address, cell phone number, date and time of the signing (e.g., as GST). In some implementations, the signer credentials can be captured from a browser and from signer profiles.

The system can then create a blockchain to track future changes to the bundle and the video. Generally, a blockchain contains a hash linked list. If for some reason, for example, the video is changed, then the new hash (for the changed video) will not match the hash value of the original video (at time the video was created); this can signal the signing process as being "tampered". In some implementations, the system can alert, e.g., set and/or send a red flag if the hash value is altered or indicate as safe if the hash value matches.

In some implementations, the system can generate an automatic audit report after each signing by which the following are recorded in the audit report, as shown in FIG. 16.

These features improve significantly technologies for digital records management, tracking, and authentication, and technologies for collaboration and authentication of documentation.

The systems and methods of the present disclosure can also be used in other fields, for example, video hashing and storing on a blockchain can give a universal appeal for both individual and corporate record keeping. This can also be used for construction sites, surveyors' video, vigilance, security, etc., and having it hashed makes sure the contents are not tampered with. It can also be used to check authenticity of pirated audio/video contents. This has broad appeal where an event of any kind can be record as a video and then stored with blockchain as security by itself or attached to another content like a document or to another video. For example, if video #1 is tampered one cannot reach video #2 in the block chain.

System Architecture

Figure 2:
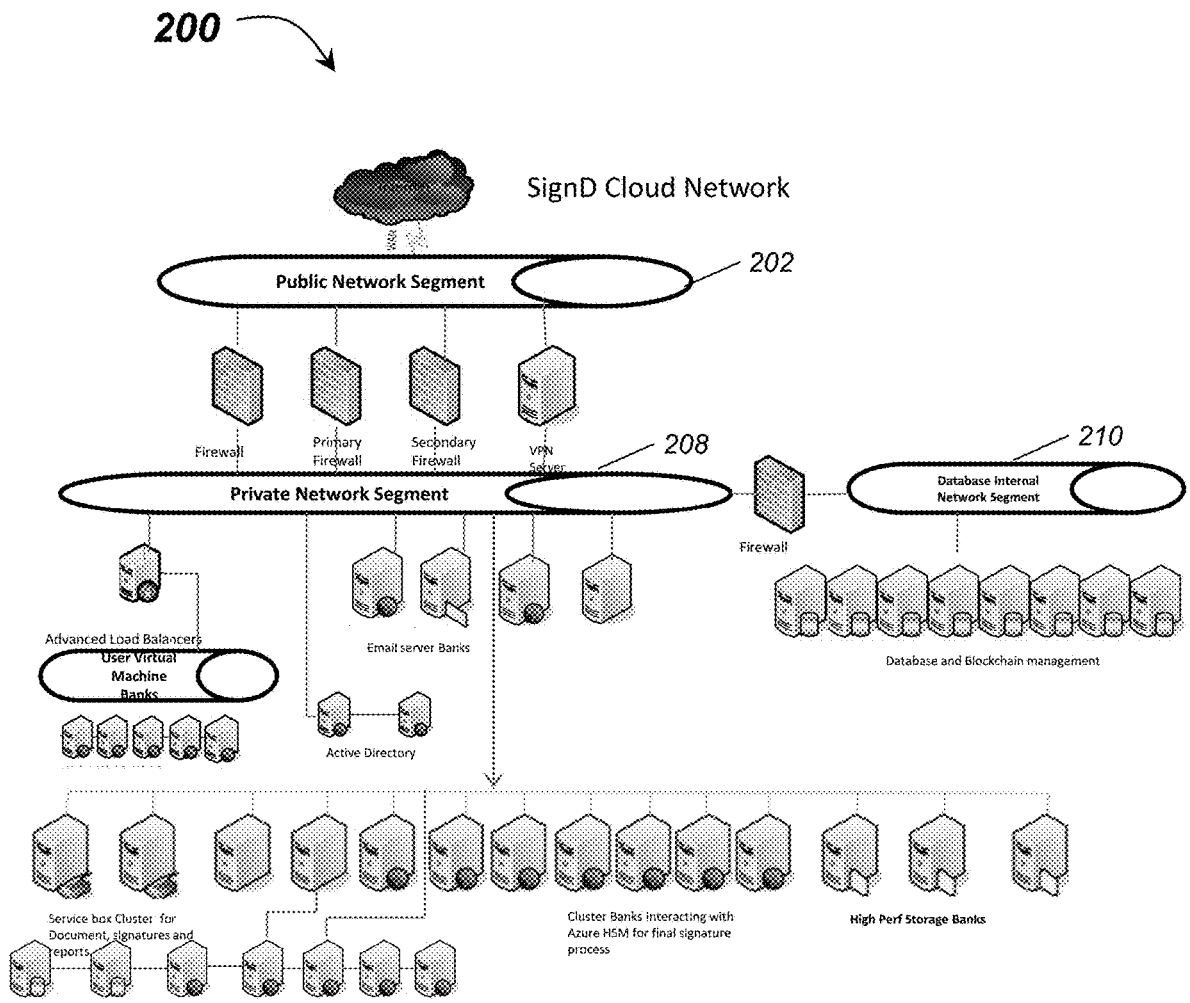
FIG. 2 shows an exemplary high-level backend topology, according to some embodiments of the present disclosure.
Figure 3:
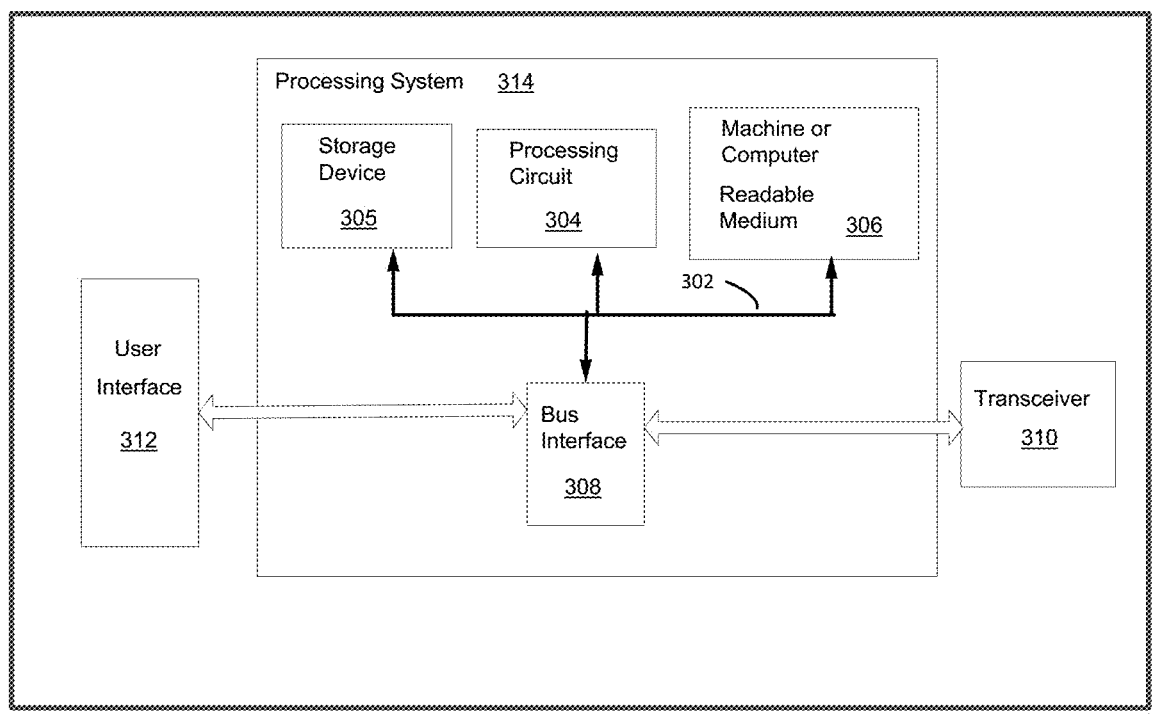
FIG. 3 shows an exemplary overall platform for various embodiments and process steps, according to some embodiments of the present disclosure.

The example of the present disclosure shown in the flow of FIG. 1 can be implemented using the exemplary hardware and system shown in FIG. 2 and FIG. 3. FIG. 2 shows an exemplary high-level backend topology 200 of servers used, and it can be, e.g., webserver coupled to database server, etc. For example, the backend can include a public network segment 202 interfacing with a public network, such as the Internet, a private network segment 208, and a database internal network segment 210. In some implementations, the backend can also include one or more virtual machine banks and storage banks. The backend can also include firewalls including primary and secondary firewalls. The front-end hardware (not shown in FIG. 2) can include the user device and all the technical detail and components that come with it. These include, for example, tablets, phones, computers and all desktop (all browsers).

FIG. 3 illustrates an exemplary overall platform 300 in which various embodiments and process steps disclosed herein can be implemented. In accordance with various aspects of the disclosure, an element (for example, a host machine or a microgrid controller), or any portion of an element, or any combination of elements can be implemented with a processing system 314 that includes one or more processing circuits 304. Processing circuits 304 can include micro-processing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionalities described throughout this disclosure. That is, the processing circuit 304 can be used to implement any one or more of the various embodiments, systems, algorithms, and processes described above. In some embodiments, the processing system 314 can be implemented in a server. The server can be local or remote, for example in a cloud architecture.

In the example of FIG. 3, the processing system 314 can be implemented with a bus architecture, represented generally by the bus 302. The bus 302 can include any number of interconnecting buses and bridges depending on the specific application of the processing system 314 and the overall design constraints. The bus 302 can link various circuits including one or more processing circuits (represented generally by the processing circuit 304), the storage device 305, and a machine-readable, processor-readable, processing circuit-readable or computer-readable media (represented generally by a non-transitory machine-readable medium 306). The bus 302 can also link various other circuits such as timing sources, peripherals, voltage regulators, and power management circuits, which are well known in the art, and therefore, will not be described any further. The bus interface 308 can provide an interface between bus 302 and a transceiver 310. The transceiver 310 can provide a means for communicating with various other apparatus over a transmission medium. Depending upon the nature of the apparatus, a user interface 312 (e.g., keypad, display, speaker, microphone, touchscreen, motion sensor) can also be provided.

The processing circuit 304 can be responsible for managing the bus 302 and for general processing, including the execution of software stored on the machine-readable medium 306. The software, when executed by processing circuit 304, causes processing system 314 to perform the various functions described herein for any apparatus. Machine-readable medium 306 can also be used for storing data that is manipulated by processing circuit 304 when executing software.

One or more processing circuits 304 in the processing system can execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit can perform the tasks. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory or storage contents. Information, arguments, parameters, data, etc. can be passed, forwarded, or transmitted via any suitable means including memory sharing, message passing, token passing, network transmission, etc.

Various aspects have been presented in terms of systems that can include several components, modules, and the like. It is to be understood and appreciated that the various systems can include additional components, modules, etc. and/or can not include all the components, modules, etc. discussed in connection with the figures. A combination of these approaches can also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

Operational aspects disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Furthermore, the one or more versions can be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips . . . ), optical disks (e.g., compact disk (CD), digital versatile disk (DVD), BluRay™ . . . ), smart cards, solid-state devices (SSDs), and flash memory devices (e.g., card, stick). Of course, those skilled in the art will recognize many modifications can be made to this configuration without departing from the scope of the disclosed aspects.

To the extent the embodiments disclosed herein include or operate in association with memory, storage, and/or computer readable media, then that memory, storage, and/or computer readable media are non-transitory. Accordingly, to the extent that memory, storage, and/or computer readable media are covered by one or more claims, then that memory, storage, and/or computer readable media is only non-transitory.

Sample User Interfaces

Figure 4:
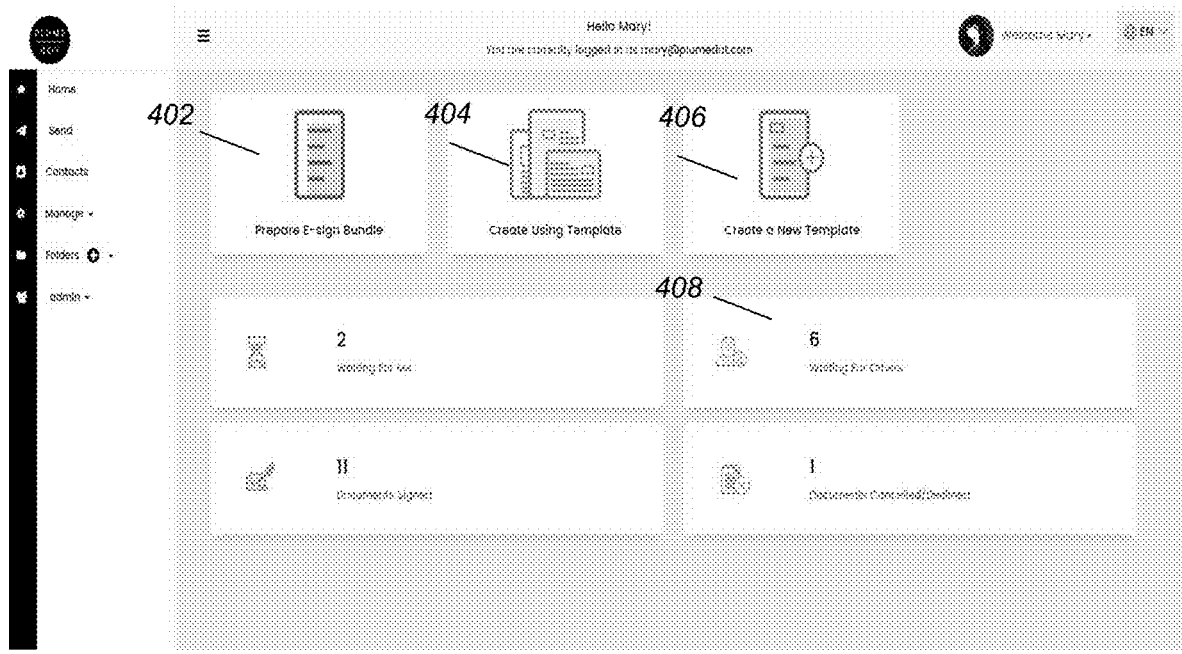

FIGS. 4 to 17 show exemplary user interfaces of the present disclosure. For example, FIG. 4 shows an exemplary user interface of a home screen shown to a user after logging into the system of the present disclosure. The user can select 402 to create a new document to be signed or select 404 to create a new document using a template, or select 406 to create a new document template. At 408, the system can indicate how many documents are waiting for action from the user.

After 404 or 406 has been selected, the system can show user interface 500, as shown in FIG. 5, to facilitate creating a bundle. At 502, the user can upload, or drag and drop, document(s).

Figure 6:
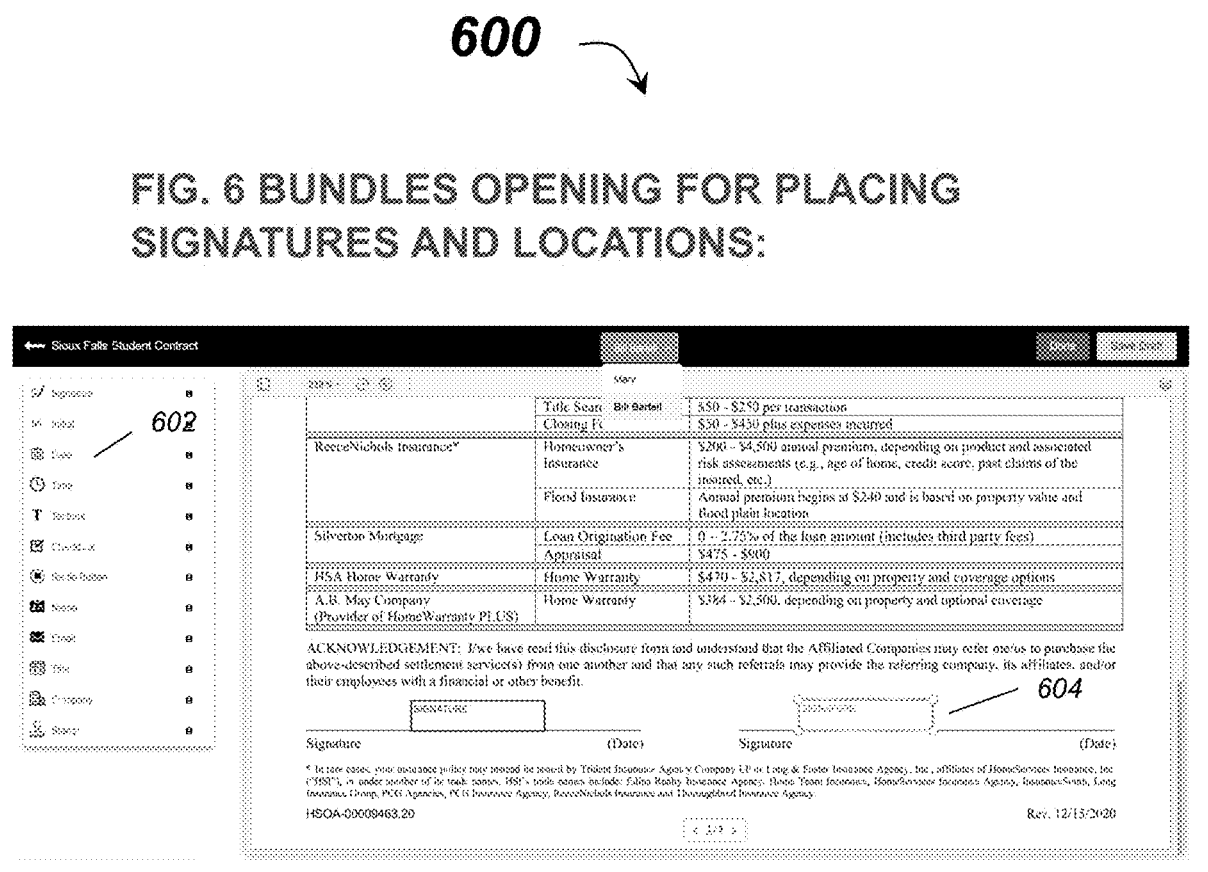

FIG. 6 shows an exemplary bundle of documents, e.g., that have been loaded, opened so that the user can indicate the locations or markers (e.g., 604) where signatures are needed, and by which signers. In some implementations, the user can select Recipients 602 to see a list of people to choose from. The list can be created manually earlier or imported from contact lists earlier.

Figure 8:
Figure 9:
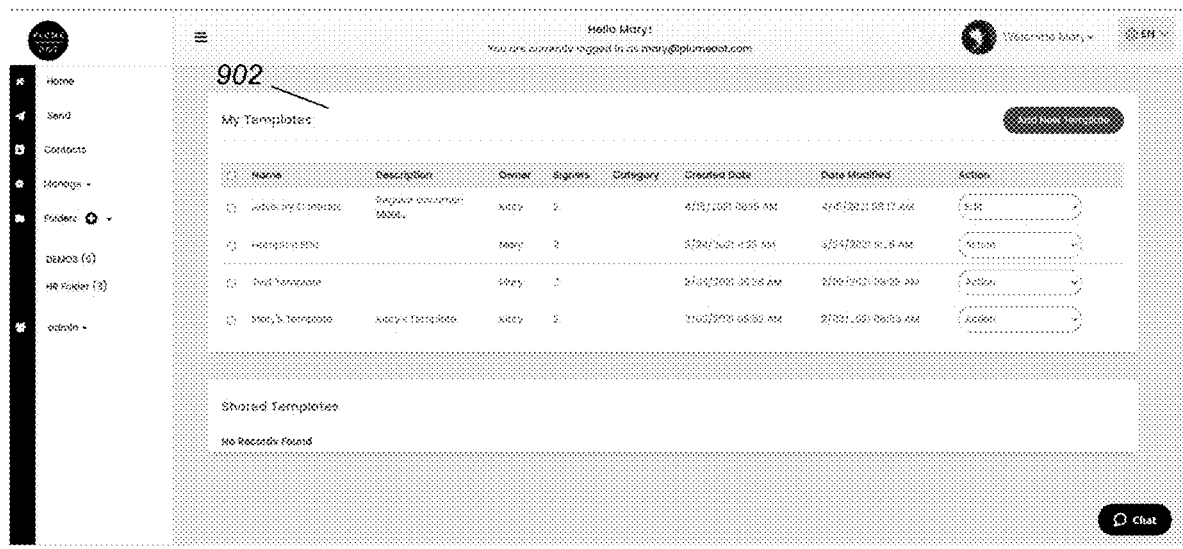

FIG. 7 shows an exemplary user interface 700 to create a document template. FIG. 8 shows an exemplary template being created. FIG. 9 is an exemplary user interface 900 showing a directory (or folder) 902 of templates created by the user. The user can then select a template for a bundle.

Figure 10A:
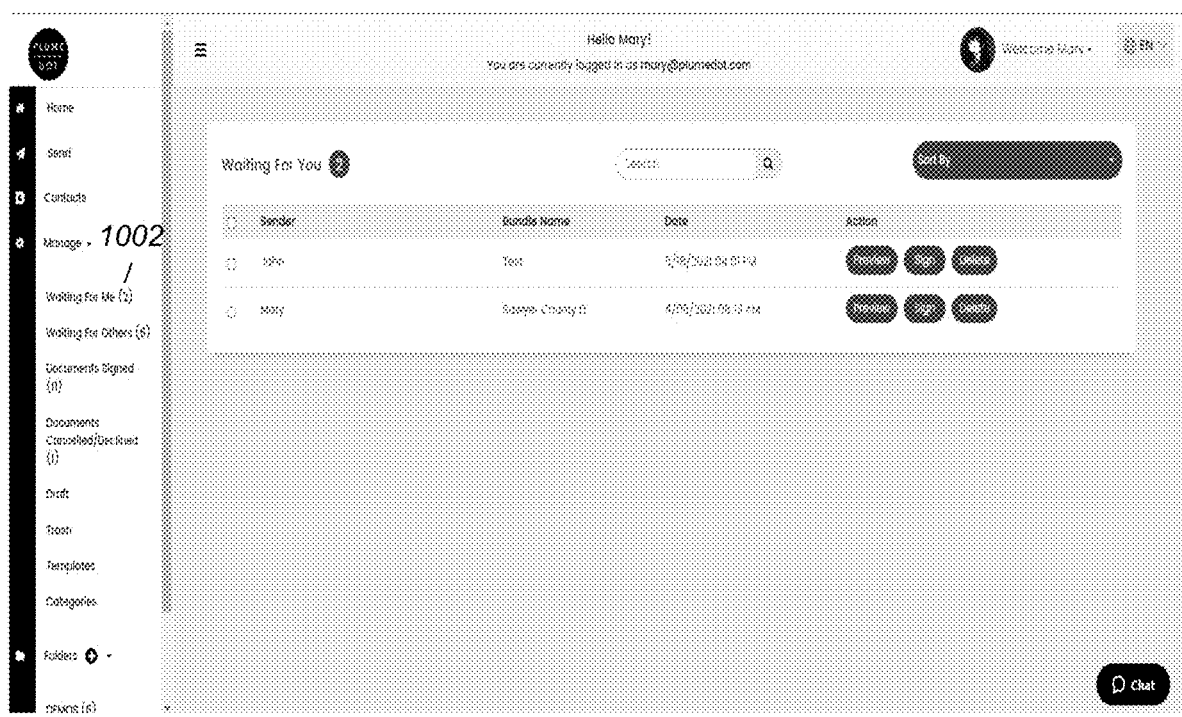
Figure 10B:
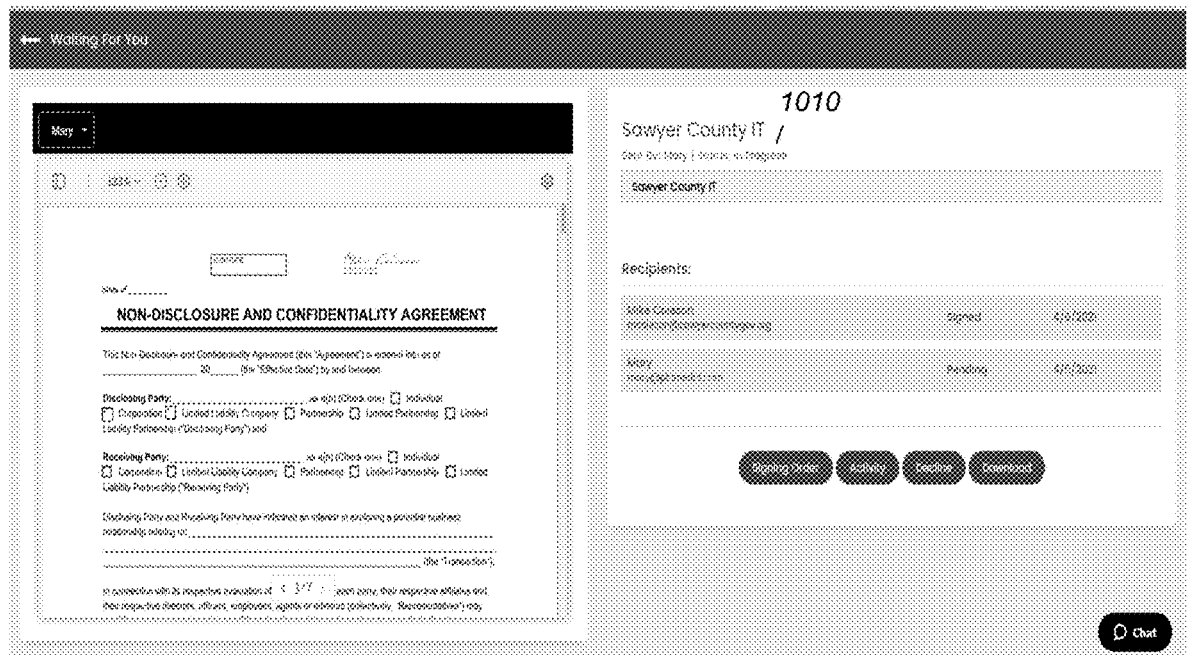

FIG. 10A shows an exemplary user interface 1000A for managing bundle or documents. Fr example, selecting 1002 lists documents with actions "waiting for you" (the user) to act on, for example, to open and review, or to sign. FIG. 10B shows list of bundles needing actions sent by a specific participant 1010.

Figures 10, 10C:

FIG. 10C shows an exemplary activity history of a bundle, e.g., when created and by who, when sent by who, when viewed by who, and so on. In some embodiments, the activity can be stored in and retrieved from a blockchain.

Figure 11A:
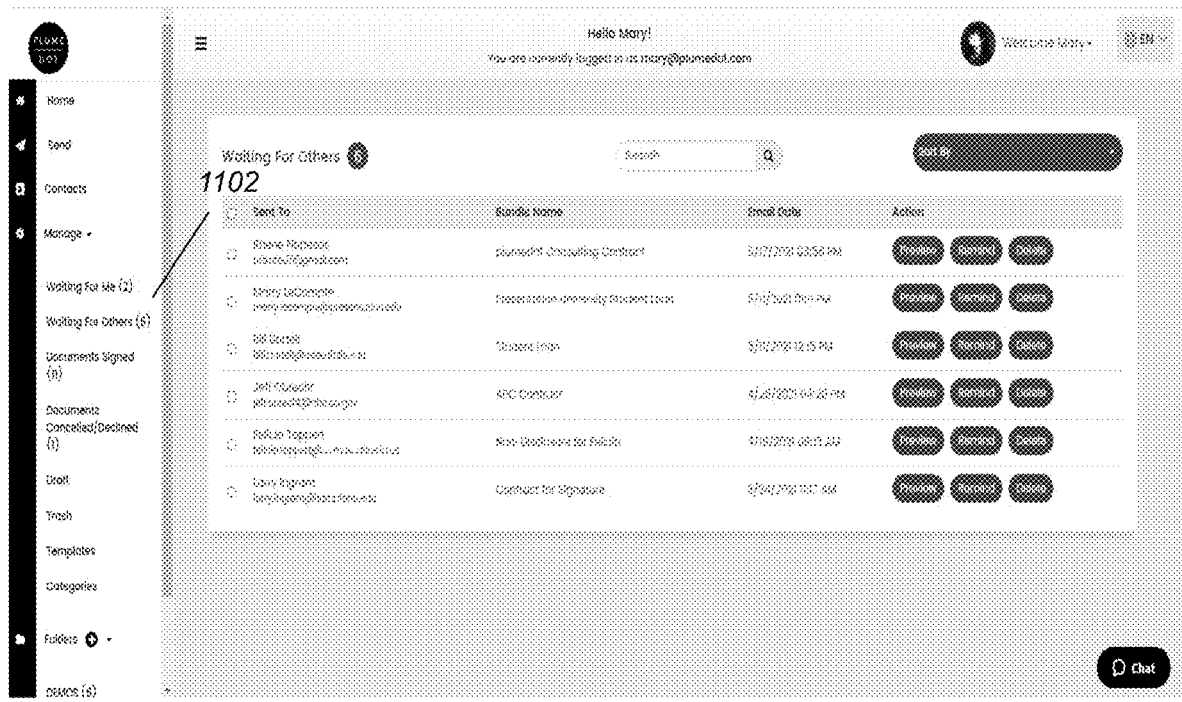
Figures 11, 11B:
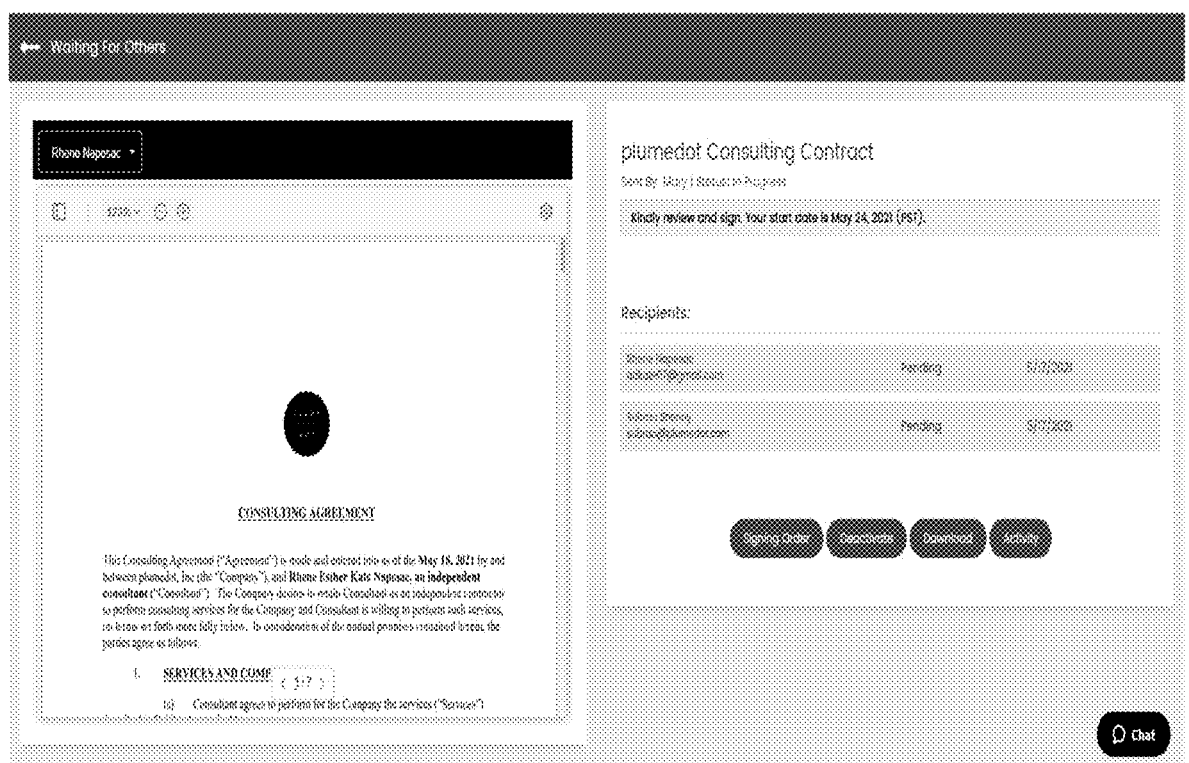
Figure 11C:
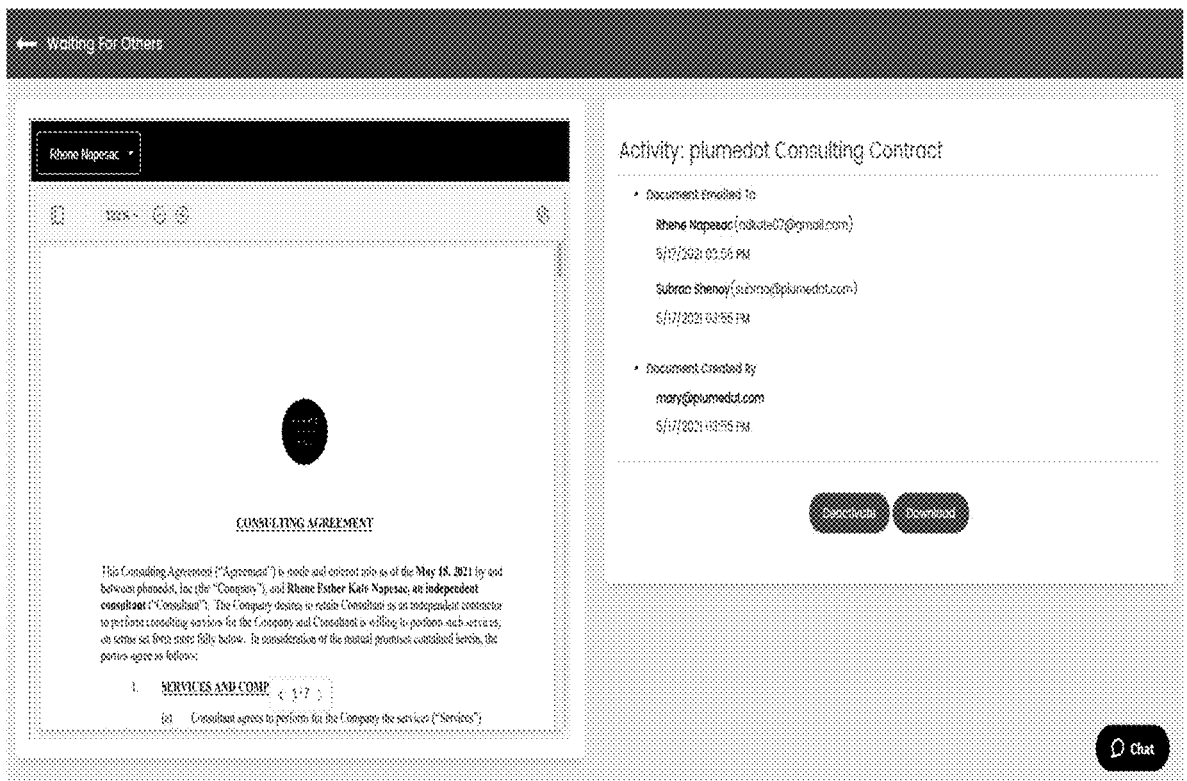
Figures 11, 11D:
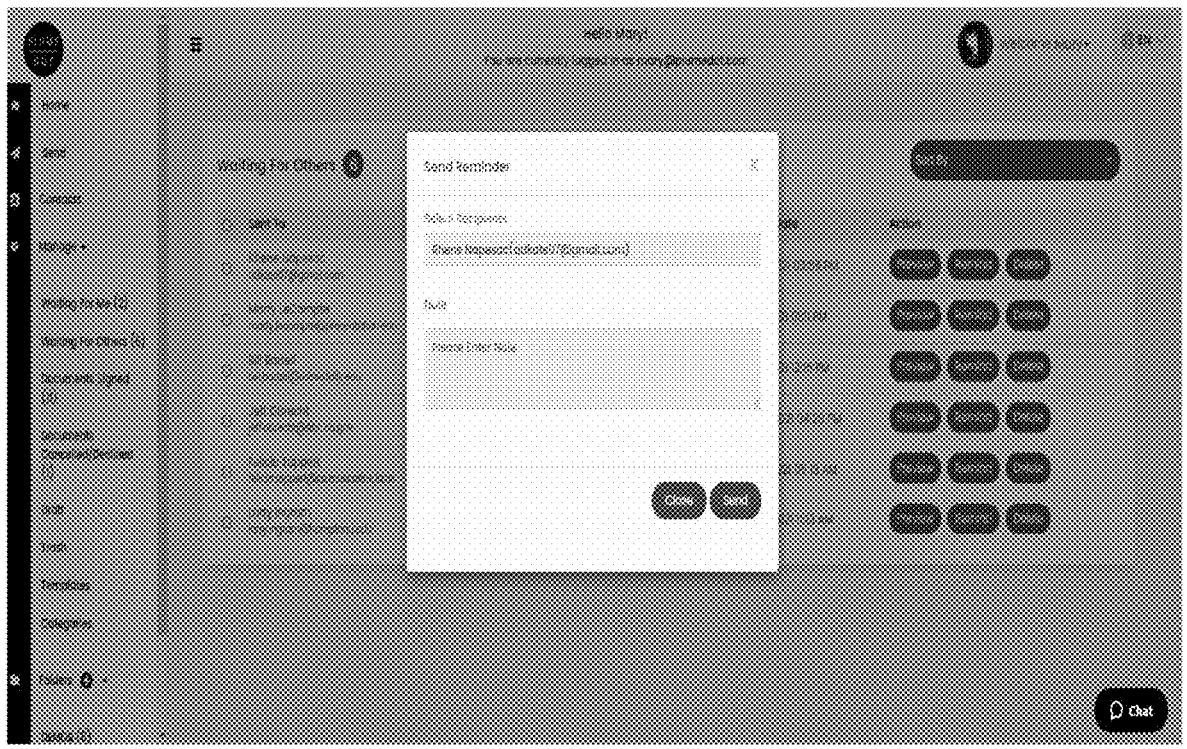

FIGS. 11A and 11B show exemplary user interfaces 1100A and 1100B showing bundle with actions "waiting for others" (other users) to act on. FIGS. 11C and 11D show exemplary user interfaces 1100C and 1100D for creating and sending reminders to selected users.

Figure 12:
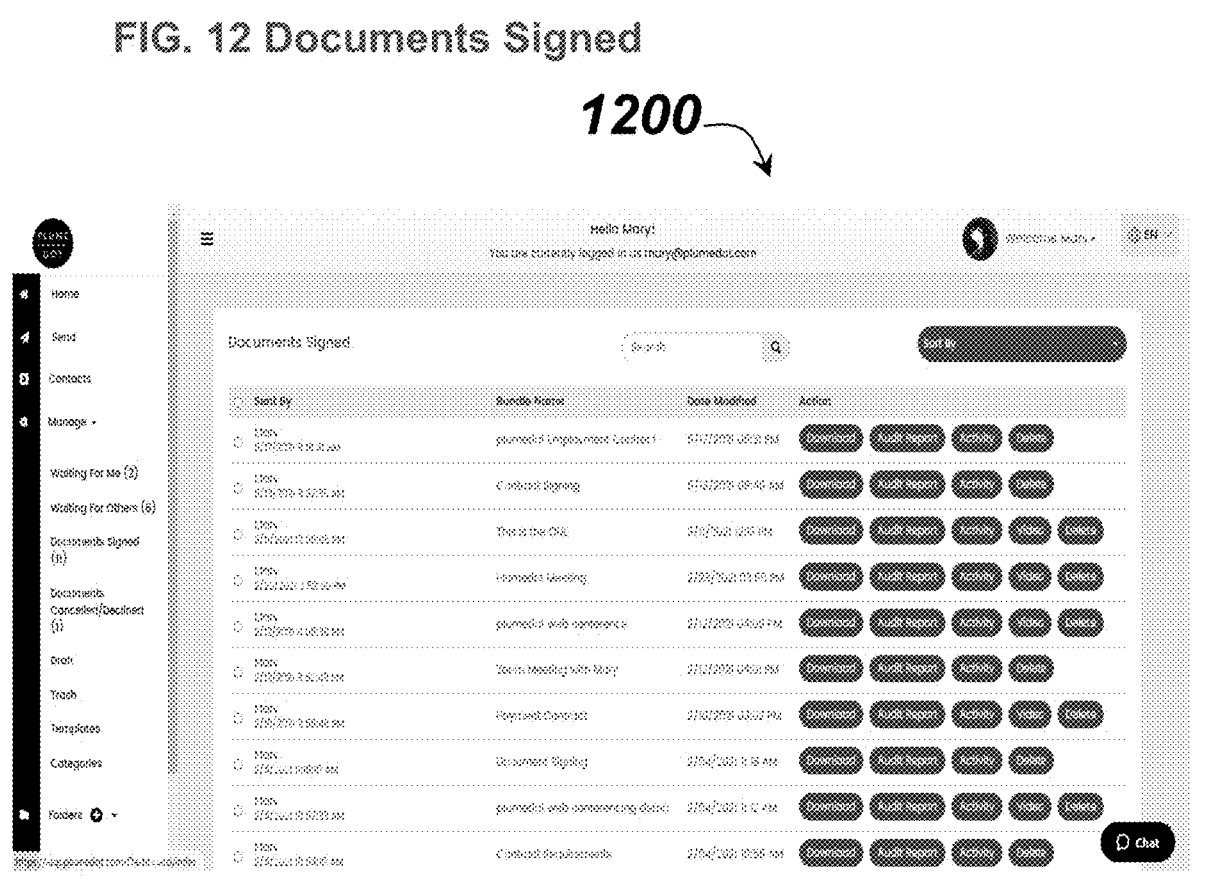
Figure 13:
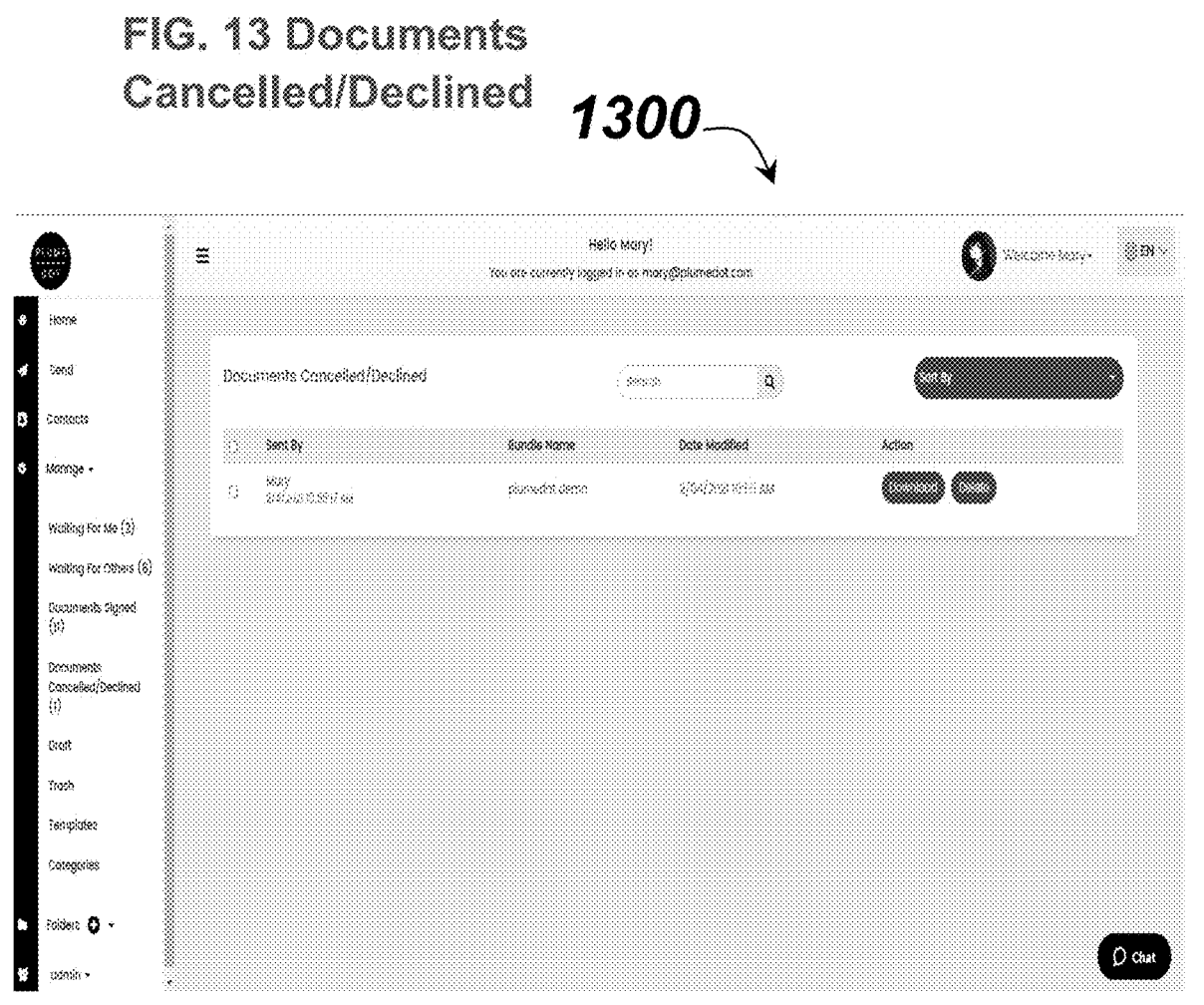

FIG. 12 shows an exemplary user interface 1200 of a directory of document signed. FIG. 13 shows an exemplary user interface cancelled or declined.

Figure 14:
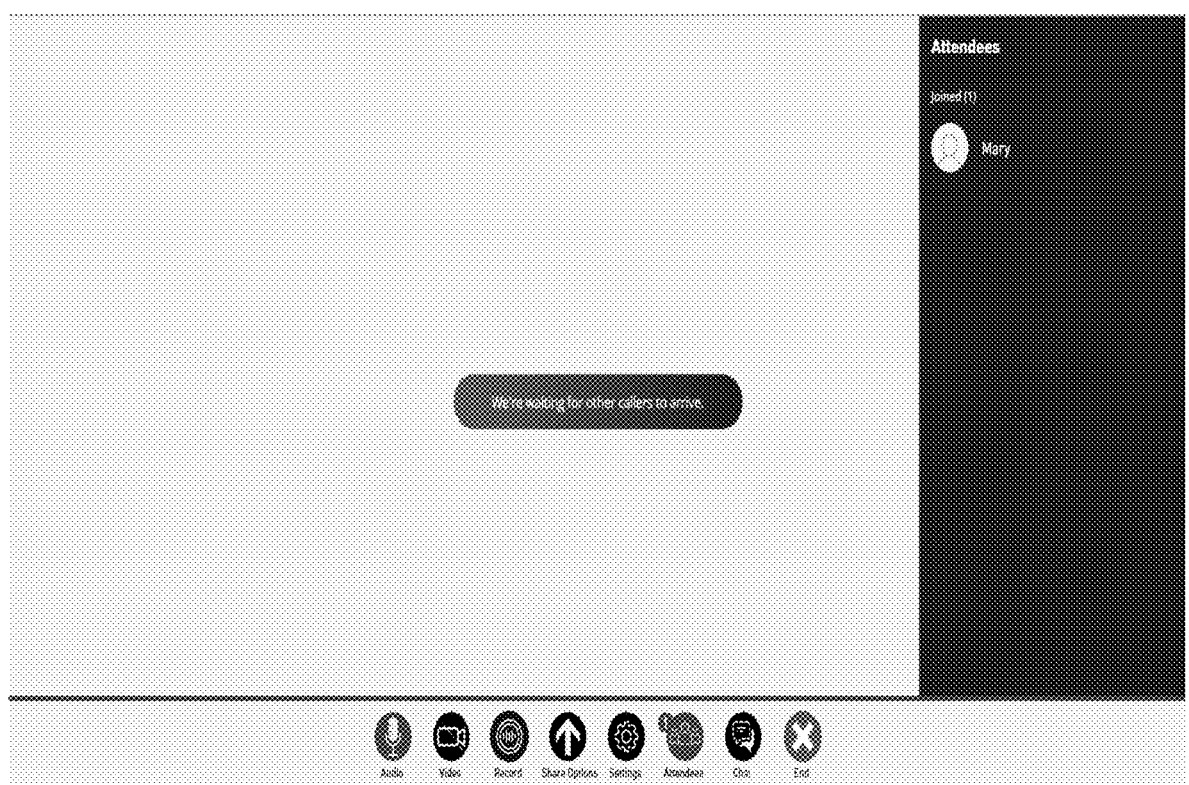

Turning to FIG. 14, an example user interface 1400 of a document signing video conference collaboration having a multiple of participants. In some implementations, any and all participants can witness any and all signings. This feature improves significantly the technologies for collaboration and authentication of documentation.

Figure 15:
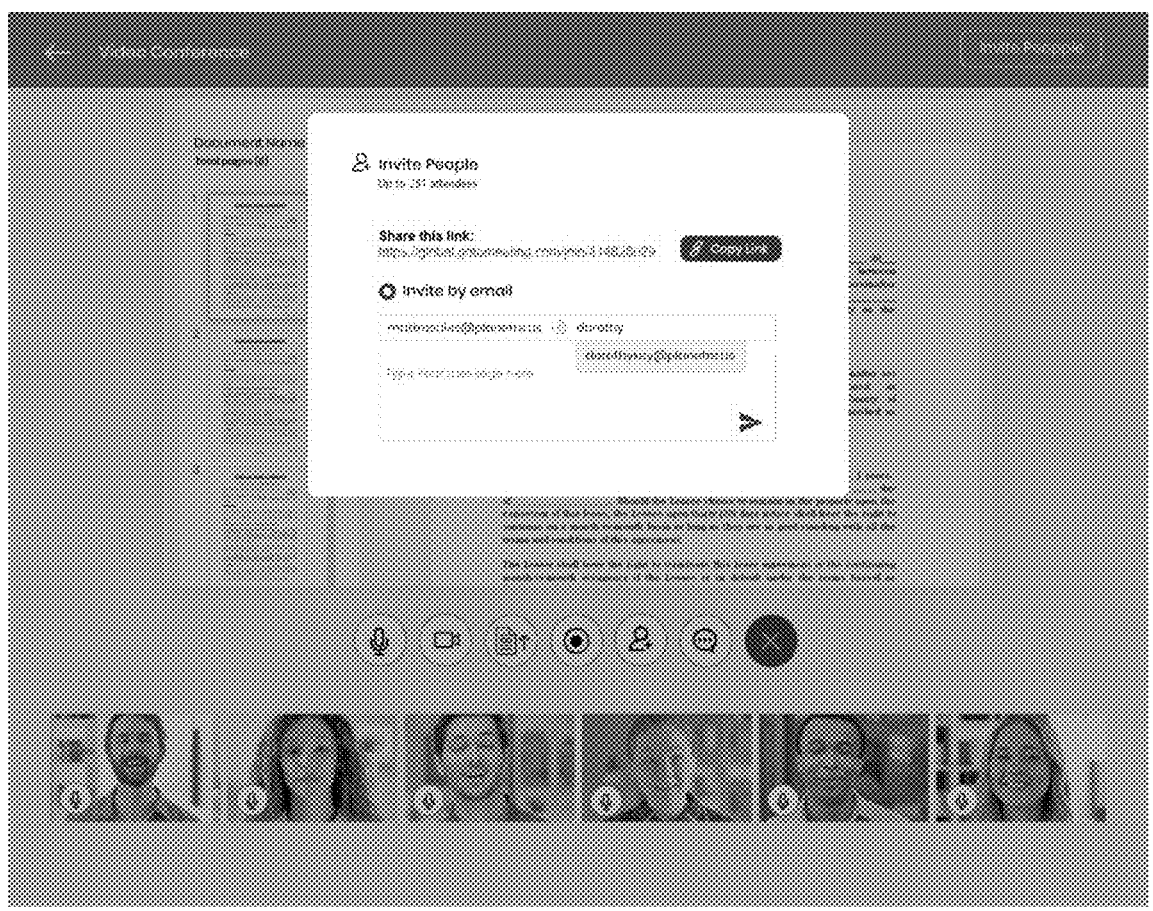

FIG. 15 shows an exemplary user interface 1500 for inviting other users to join a video conference to sign document(s). The invitation can be spontaneous.

As shown in FIG. 16, once a document has been signed by all participants, the system can generate a hash function of the recorded video. The hashed value can be displayed, for example, at the bottom of the last page, and stored as part of the digital signing on the document.

Figure 17:
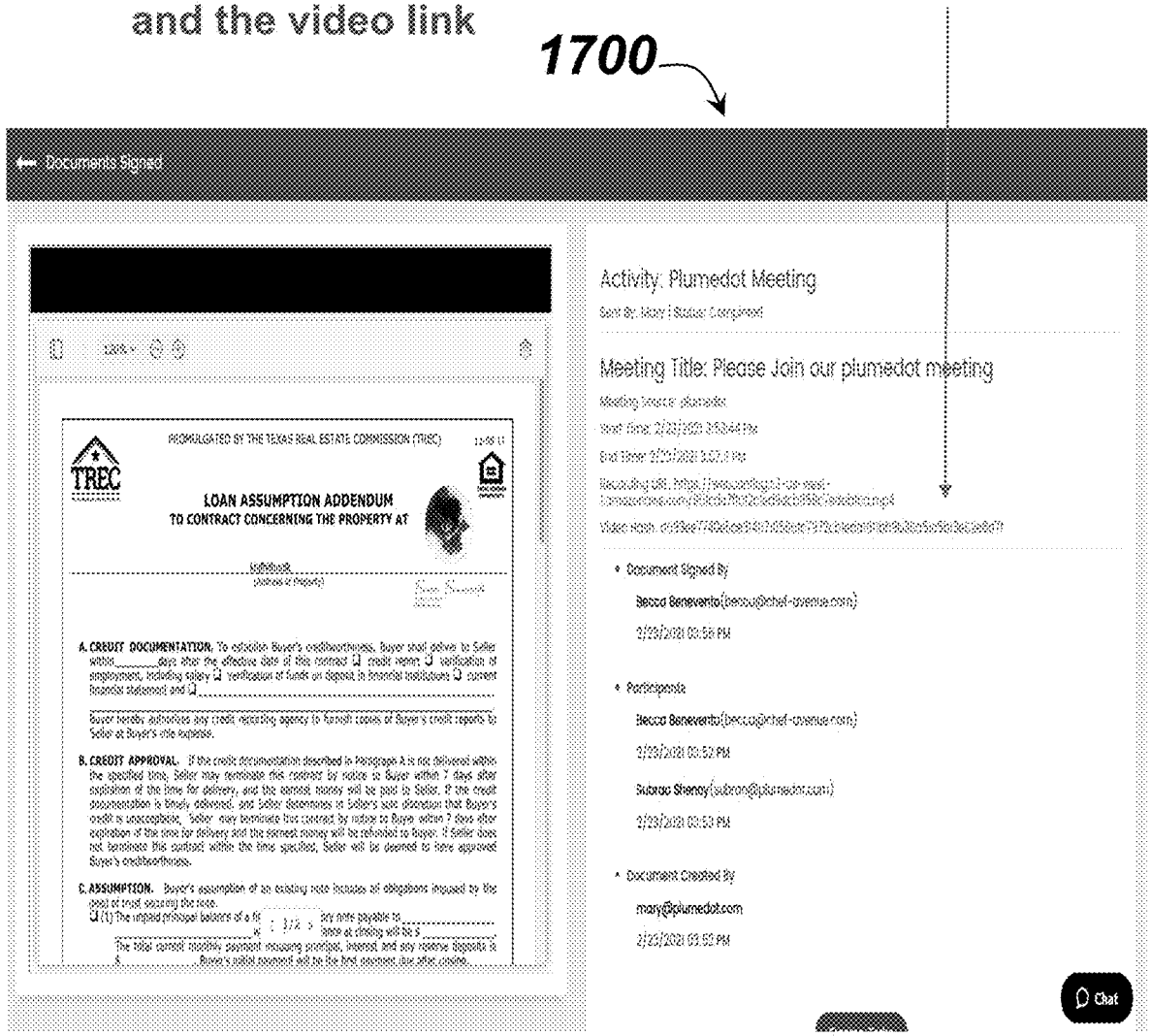

FIG. 17 shows an exemplary user interface 1700 of bundle directory, where the hash value can be displayed.

This can indicate that the document was signed with video conferencing. It was recorded with a hash value and stored in a blockchain.

It should also be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments can be recited in or added to the claims, as well as negative limitations that define the inventive scope of the claims by features, functions, steps, or elements that are not within that scope.

It is to be understood that this disclosure is not limited to the particular embodiments described herein, as such may, of course, vary. It is also to be understood that the terminology used herein is for the purpose of describing particular embodiments only and is not intended to be limiting.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

What is claimed is:

1. A computer-implemented method for blockchain driven embedded video and digital signature on a signed document, the method comprising:
receiving a document for digital signature;
receiving input indicating one or more locations for digital signature;

receiving input indicating video requirement for the signed document;

sending a digital link to a user, wherein the digital link is configured to load a digital document and a videoconference session;

receiving a digital signature for each of the one or more locations;

receiving a video of the videoconference session;

generating a hash value for the signed document and the video;

storing the video, the signed document and the hash value; and updating a blockchain including the video, the signed document and the hash value.

2. The computer-implemented method of claim 1, wherein the digital signature is at least one of name, title, and date.

3. The computer-implemented method of claim 1, wherein sending the digital link to the user includes sending an online notification.

4. The computer-implemented method of claim 1 further comprises:

receiving an updated copy of the blockchain;

verifying a hash value in the updated copy of the blockchain; and if the hash value does not match the stored hash value, determine that the updated copy of the blockchain contains at least one of a tempered copy of the signed document or a tampered video thereby invalidating a contract integrity.

5. The computer-implemented method of claim 1 further comprises digital signature from one or more users.

6. The computer-implemented method of claim 5, wherein the videoconference session includes one or more users.

7. A computer-implemented method for hash-based embedded video and digital signature on a signed document, the method comprising:

receiving a document for digital signature;

receiving input indicating one or more locations for digital signature;

receiving input indicating video requirement for the signed document;

sending a digital link to a user, wherein the digital link is configured to load a digital document and a videoconference session;

receiving a digital signature for each of the one or more locations;

receiving a video of the videoconference session;

generating a hash value for the signed document and the video; and storing the video, the signed document and the hash value.

8. The computer-implemented method of claim 7, wherein the digital signature is at least one of name, title, and date.

9. The computer-implemented method of claim 7, wherein sending a digital link to a user includes sending an online notification.

10. The computer-implemented method of claim 7 further comprises:

receiving an updated copy of the document;

verifying a hash value in the updated copy of the document; and if the hash value does not match the stored hash value, determine that the updated copy of the document contains at least one of a tempered copy of the signed document or a tampered video thereby invalidating a contract integrity.

11. The computer-implemented method of claim 7 further comprises digital signature from one or more users.

12. The computer-implemented method of claim 11, wherein the videoconference session includes one or more users.

* * * * *